United States Patent [19]

Watanabe

[11] Patent Number: 5,014,775
[45] Date of Patent: May 14, 1991

[54] OIL COOLER AND MANUFACTURING METHOD THEREOF

[75] Inventor: Hiroshi Watanabe, Hadano, Japan

[73] Assignee: Toyo Radiator Co., Ltd., Tokyo, Japan

[21] Appl. No.: 523,689

[22] Filed: May 15, 1990

[51] Int. Cl.[5] .......................... F28D 9/00; F01M 5/00; F01M 11/03; F28F 3/08

[52] U.S. Cl. .................................... 165/167; 165/51; 165/166; 165/916; 228/175; 228/183; 123/41.33; 123/196 AB; 184/104.3

[58] Field of Search ................... 165/41, 51, 166, 167, 165/916; 123/196 AB, 41.33; 228/175, 183; 184/104.3

[56] References Cited

U.S. PATENT DOCUMENTS

| | | | |
|---|---|---|---|
| 3,743,011 | 7/1977 | Frost | 165/167 |
| 4,271,901 | 6/1981 | Buchmüller | 165/916 |
| 4,580,625 | 4/1986 | Yamanaka et al. | 165/167 |
| 4,742,866 | 5/1988 | Yamanaka et al. | 165/916 |
| 4,892,136 | 1/1990 | Ichihara et al. | 165/51 |

FOREIGN PATENT DOCUMENTS

| | | | |
|---|---|---|---|
| 0128092 | 6/1986 | Japan | 165/916 |
| 0017594 | 1/1987 | Japan | 165/916 |
| 0202997 | 9/1987 | Japan | 165/916 |
| 2140908 | 12/1984 | United Kingdom | 165/916 |

Primary Examiner—John Ford
Attorney, Agent, or Firm—Sughrue, Mion, Zinn, Macpeak & Seas

[57] ABSTRACT

An oil cooler for motor oil used in engines has an element core, a base on which the core is placed, and a casing housing the element core. The core consists of a plurality of sets of two elements being combined together face-to-face and a fin member which is placed on the set of elements. These two elements and one fin member are join together to make a single unit. Several units are contained in the casing of the oil cooler. Cooling water circulates through the flat hollow doughnut-like elements combined. A partition is formed in the interior of the elements combined and a set of cooling water supply hole and exit hole is provided at both the sides of the partition. The core of elements and a base on which the core is placed are brazing adhered or fixed to each other in a hot vacuum furnace and then a dish-like cap is applied to the base. Motor oil to be cooled is led from the engine block to a filter mechanism through several fin members situated between elements. Cooling water is supplied and withdrawn through a pair of pipes connected to the base.

2 Claims, 4 Drawing Sheets

FIG. 3
FIG. 4
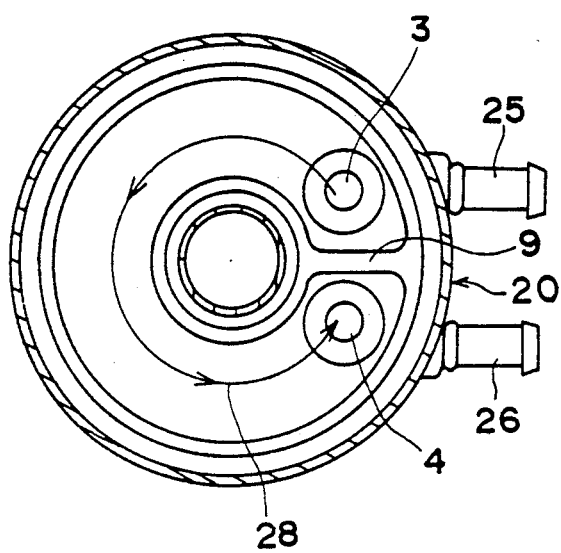
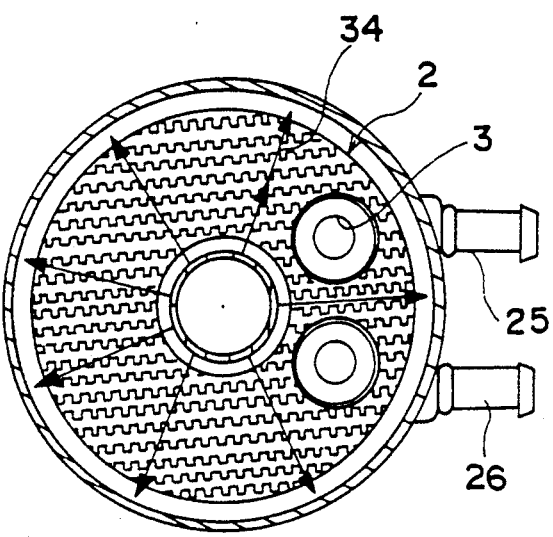
FIG. 5
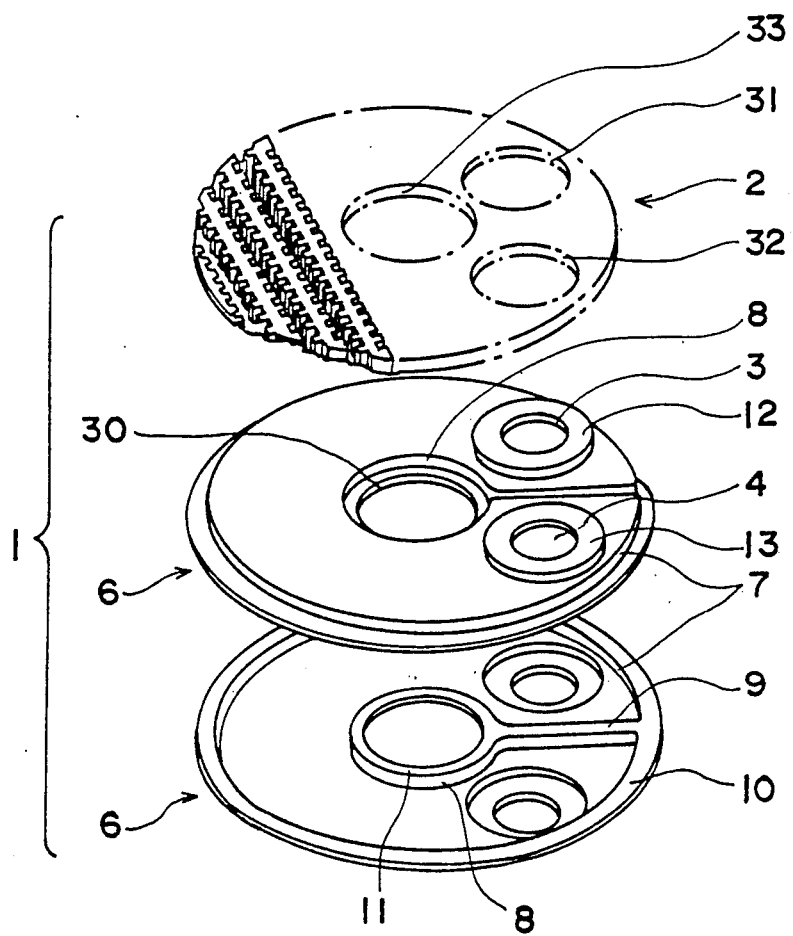

OIL COOLER AND MANUFACTURING METHOD THEREOF

BACKGROUND OF THE INVENTION

1. Field of the Invention

The present invention relates to an oil cooler adapted to be attached or applied to, for example, an engine housing of cars and motor cycles from the outside, and in particular to an oil cooler provided with few places of sealed portions between a motor oil passage and a cooling water passage, so that mixturing chance of the motor oil and the cooling water is considerably reduced, which cooler being of a simple construction and compact, and a manufacturing method for the oil cooler above.

2. Description of the Prior Art

In general, the engine rooms of cars and motor cycles and the like machines have been lubricated and cooled by using engine or motor oil. An engine block of the engine housing has an inlet port of the lubricant passage to which inlet port an oil cooler is seated through an O-ring. Such oil cooler is described in U.S. Pat. No. 3743011. According to the prior art described in the U.S. Patent, the oil cooler has a plurality of elements of a shape of flat doughnut through which elements motor oil circulates and around which elements cooling water circulate. The oil once enters an oil filter through a bypass formed in the core of the oil cooler, then flows from the oil cooler casing to the cooler elements. According to the conventional oil cooler above, the core element is fabricated by a pair of metal sheets provided with relatively many holes formed through the metal sheets. In consequence, the oil passage becomes considerably complicated, the area of the metal sheets to be sealed or of water-tight increases, making the production of the core elements complicate and difficult, and the number of parts increases.

Some oil coolers have been produced from aluminum so as to reduce the weight. Such aluminum-made oil coolers have core elements provided with coverings of a brazing shet which has been previously applied to the exterior surfaces of the elements. The coverings of the core elements are treated in a vacuum furnace. In detail, after respective parts or members of the conventional aluminum oil cooler have been assembled, the assembled oil cooler is placed in the vacuum furnace so as to melt only the covering. Then the braze covering is solidified in order to fix and bind respective parts to each other. Particular material of the braze covering of a kind to be melted at the temperature lower than that of the core elements by about 5-10 degrees C. is necessary to be selected. And it is necessary to keep the interior temperature of the vacuum furnace at 610-615 degrees C. in order to carry out effective braze welding of respective parts and members. It is noted that, however, both the core elements and the oil cooler casing can not be braze jointed or fixed simultaneously, because radiation heat generated in the vacuum furnace fails to sufficiently distribute or permeate every corners of the parts and members of the oil cooler after the core elements and the casing are assembled. As a result, the braze coverings applied on each part are apt to be melted insufficiently. According to another manufacturing method of the conventional oil cooler, the core elements and the cooler casing are manufactured and braze-treated separately, then the elements are installed in the casing. Consequently, much contacting area is formed between the core elements and casing, so that many sealing members are necessary and the number of parts disadvantageously increases.

3. Summary of the Invention

Accordingly, it is an object of the present invention to provide a novel oil cooler used to engines in which the shortcomings above of the conventional oil coolers are solved.

It is another object of the present invention to provide an oil cooler having few portion to be sealed between the oil passage and cooling water passage and, therefore, few chance of blending the oil and water.

It is still another object to provide a novel oil cooler of a simple structure.

It is still another object to provide a producing method of aluminum-made oil coolers, by which method the core elements and the casing can be assembled in degree as higher as possible before the assembled oil cooler is braze jointed in the vacuum furnace.

The various objects of the present invention are attained by providing the oil cooler provided with the following conditions.

(i) The oil cooler of the present invention has a core placed within a cooler casing and the core is constructed by a plurality of flat and hollow doughnut-like elements 1 and fin members 2 sandwiched between two flat and hollow doughnutlike elements 1. These elements each has a pair of cooling water flowing holes 3 and 4 which are matched or coincided in position with the adjacent holes 3 and 4 of the adjacent element just under or above the former one with the fin member 2 having corresponding holes formed therein being placed on the set of elements. Cooling water flowing holes 3 and 4 of the uppermost or top elements of the core are closed by a closing means 5.

(ii) Each element 1 consists of a pair of metal plates 6 and 6 of a flat doughnut shape and has an inner circumferential wall 8 and an outer circumferential wall 7 of the same height, which walls are formed on the inner circumference and the outer circumference of the metal plate 6. A partition ridge 9 extends diametrically between the inner and the outer circumferential walls 8 and 7 and has the same height as that of these walls. The flowing holes 3 and 4 are placed at both sides of the partition ridge 9 and respectively have hole peripheral or ring-like portions extended or projected outward so as to make flanges 10, 11, 12 and 13 used for braze treatment. A plurality of metal plates 6 are piled up on each other so as to face a concave face of the plate 6 to an opposite or convex surface of other adjacent plate 6 just under or above the former.

(iii) The cooler casing housing the element core 24 consists of a planar doughnut-shaped base 14, a central pipe 15 attached to an inner peripheral edge through its end, and a dish-like member 18 having a central opening 16 to which another end of the central pipe 15 is attached so as to form second oil openings 23 around the circumferential edge of the central opening 16. The dish-like member 18 is attached to the base 14 through its outer pendent edge. A first gap 19 is formed between the inner circumferential edge of the core 24 and the outer wall of the central pipe 15 and a second gap 27 is formed between the outer circumferential edge of the core 24 and the inner wall of the pendent portion of the dish-like member 18. The lower end of the first gap 19 near the base 14 opens and the upper end near the dish-like member 18 closes. Oppositely the lower end of the second gap 27 near the base 14 closes and the upper end adjacent to the dish-like member 18 opens.

(iv) The base 14 has a pair of dents or concavities 21 and 22, respectively formed therein so as to be oppose to the pair of ho.les 3 and 4 of the adjacent element 1. In addition, the base 14 has a pair of cooling water flowing pipes 25 and 26, respectively led to the concavities 21 and 22, which cooling water flowing pipes extend outward from the base 14. The first oil hole 17 is formed in the base 14 so as to be led to the first gap 19.

The last object of the present invention is attained by providing the oil cooler manufacturing method which contains the following conditions.

The method is adapted to manufacture the oil cooler containing a core in its casing according to the present invention. Structural parts of the oil cooler are made of aluminum or its alloy materials and coverings of a brazing material are previously applied to at least one of two structural parts to be adhered to each other. The method has the following structural conditions.

(i) A step in which the dish-like member 18 constituting a part of the oil cooler casing 20 is removed, an assembly of core elements 24 is placed on the base 14 constituting another part of the casing 20, the brazing sheet coverings applied to the elements 1 are melted in the vacuum furnace of a high temperature, and the soft brazing sheet coverings are solidified in order to attach all parts or members including the base 14 integrally.

(ii) Another step by which the outer pendent edge of the dish-like member 18 is welded to the outer circumferential edge of the base 14 of the oil cooler casing 20, and the top portion of the center pipe 15 is welded to the central opening 16 of the dish-like member 18.

(iii) The core 24 is fabricated by piling up a plurality of flat and hollow doughnut-like elements 1, inserting the fin members 2 between two adjacent elements 1, making the cooling water flowing holes 3 and 4 of an element 1 correspond or match to the holes 3 and 4 of the adjacent element 1, and closing the cooling water flowing holes 3 and 4 of the top element 1 by means of the closing means 5.

(iv) Respective elements 1 are made of a pair of flat and doughnut-like metal plates 6 and 6 having the inner circumferential wall 8 and the outer circumferential wall 7 of the same height, respectively formed at the inner circumference and the outer circumference thereof. The pair of cooling water flowing holes 3 and 4 are placed adjacently at both sides of the ridge 9 extending in the diameter or radius direction of the metal plate 6 and having the same height as that of the walls 7 and 8. The flat and ring-like edges are projected outward from these holes 3 and 4 in order to form flanges 10, 11, 12 and 13 used to brazing joint these metal plates 6 to each other in a manner of back-to-back or front-to-front arrangement so as to make respective flowing holes 3 and 4 correspond to adjacent flowing holes 3 and 4.

(v) The oil cooler casing 20 has as described above the flat and doughnut-like base 14, the central pipe 15 attached to the inner circumference of the base 14 through an end thereof and to the central opening 16 through another end thereof. The set of second oil holes 23 are provided around the central opening 16 of the dish-like member 18 to be fixed to the base 14 through its outer circumference. The dish-like member 18 constitutes a part of the oil cooler casing 20. The first gap 19 is formed between the inner circumferential vertical face of the core 24 and the outer wall of the pipe 15 and the second gap 27 is provided between the outer circumferential vertical face of the core 24 and the inner face of the outer circumferential pendent edge 29. The first gap 19 has its opening at the side of the base 14 and another opening at the side of the dish-like member 18 is closed. The end adjacent to the base 14 of the second gap 27 is closed and another end adjacent to the dish-like member 18 opens.

(vi) The base 14 has a pair of concaves 21 and 22 placed so as to face the pair of flowing holes 3 and 4, respectively formed in the element 1 adjacent to the base 14, and also a pair of cooling water pipes 25 and 26, respectively led to these concaves 21 and 22, which pipes project outward from the outer periphery of the base 14. The circumferential edge of the element 1 adjacent to the base 14 or placed just above the base is connected to the circumferential edge of the base 14. In addition the base 14 has a first oil hole 17 shaped as shown.

The objects and other objects, and features and advantages of the present invention will be apparent by reading the following detailed description stating the illustrative example or preferred embodiment with reference to the accompanying drawings.

FIG. 3 is a section taken along the line III—III of FIG. 1,

FIG. 4 is a section taken along the line IV—IV of FIG. 1;

FIG. 5 is a perspective and exploded view of the element used in the oil cooler;

PREFERRED EMBODIMENTS OF THE INVENTION

While the oil cooler of the present invention may be used in various situations, it will be specifically described in its application to an engine of a car and the like.

Figure 1:
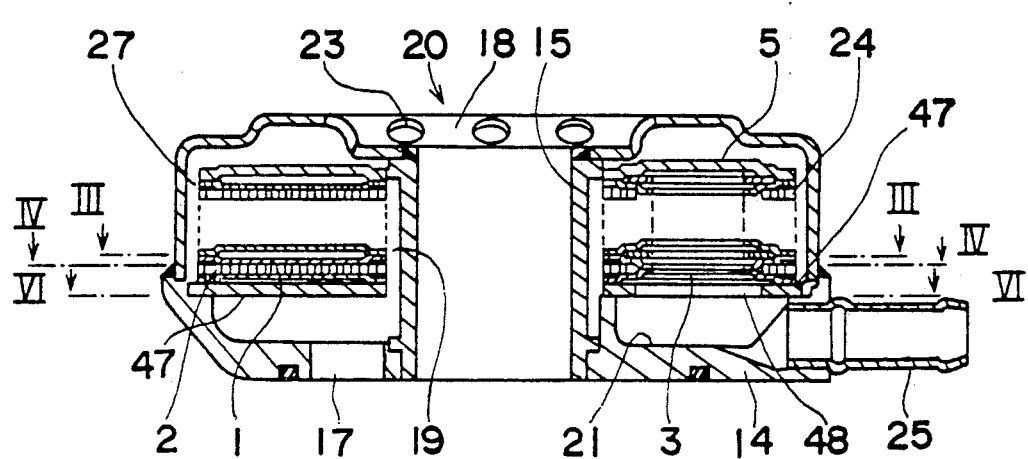
FIG. 1 shows a section taken along the line I—I of FIG. 2 depicting an oil cooler according to the present invention.
Figure 2:
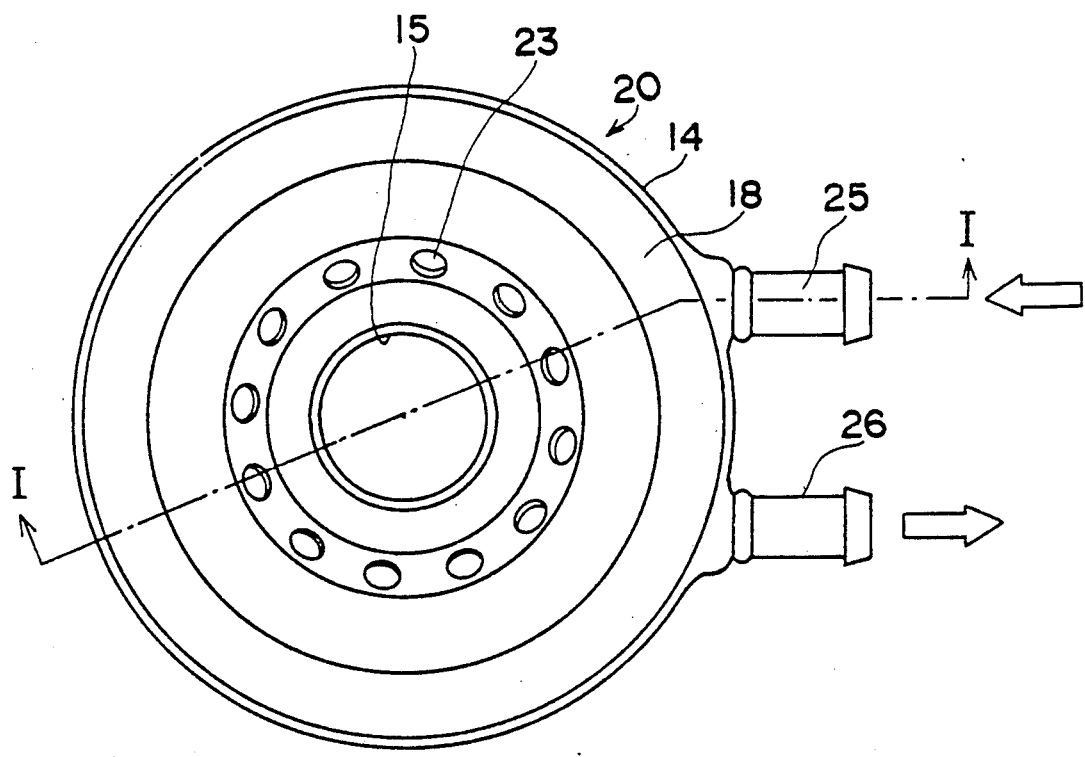
FIG. 2 is a flat view of the oil cooler.
Figure 8:
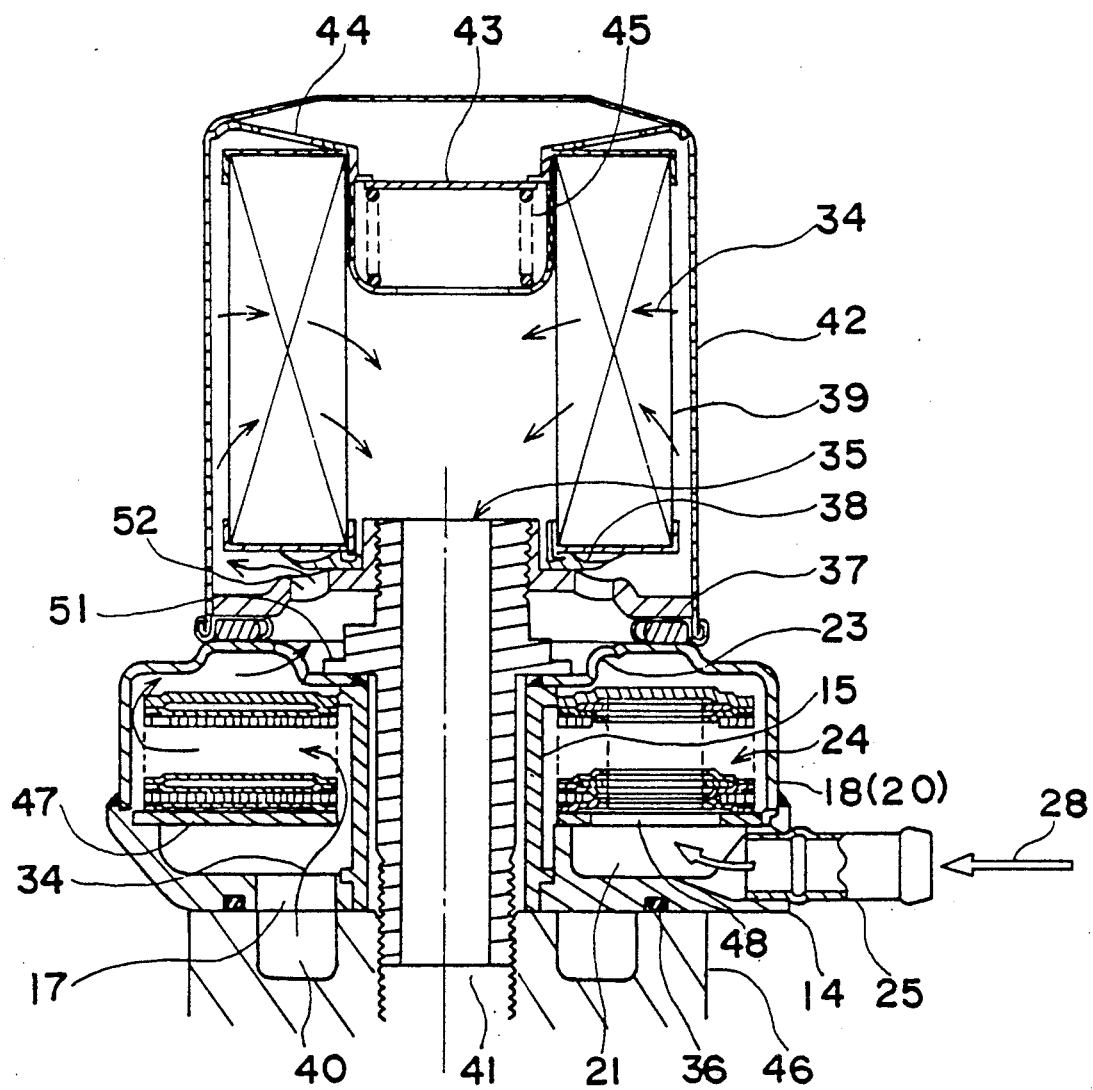
FIG. 8 is vertical section of the oil cooler when it is used with reference to an engine.

The oil cooler shown generally in FIG. 1 is placed on an engine block 46 and fixed there by a large center bolt 35 (FIG. 8). In the application shown, an oil filter is secured to the top of the oil cooler of the present invention. FIGS. 1–5, respectively show one of the preferred embodiments of the oil cooler fabricated according to the present invention.

The general components of the oil cooler are a core 24 and a casing 20. As shown in FIG. 5, the core 24 is generated by assembling or piling a plurality of elements 1 shown in FIG. 5 to each other. Respective parts or members of the elements 1 are brazing jointed to each other, a closing means 5 is placed on the top element 1, and an end plate 47 is adapted to the lowest element 1. These closing means 5 and end plate 47 are made of saucer-shaped metal plates, respectively having the same inner circumferential diameter and outer circumferential diameter as the diameters of the element 1. The end plate 47 to be placed at the lowest edge of the core 24 has a pair of holes 48 formed at the position of the cooling water flowing hole 3 of the element 1. It is noted that the closing means 5 don't have such holes 48.

Next, the construction of the element 1 will be described with reference to FIG. 5. The element 1 consists of a pair of saucer-like metal plates 6 and a fine member 2 as shown. The metal plate 6 has a disc shape and a central opening 30, and an inner circumferential wall 8 and an outer circumferential wall 7 of the identical height with each other. Also, the metal plate 6 has a straight partition ridge 9 of the same height as that of the walls 7 and 8. The ridge 9 connects both the walls 7 and 8 and extends along the diametrical direction of the metal plate. The pair of cooling water flowing holes 3 and 4 are formed at both sides of and adjacent to the partition ridge 9. The peripheral edges of the flowing holes 3 and 4 project outward of the plane of the metal plate 6. Flanges 12 and 13 are formed at the projected edges of the flowing holes 3 and 4. The ring-like flanges 12 and 13 are used to brazing joint the projected edges of the holes 3 and 4 of a metal plate 6 to other edges of other adjacent plate 6. Additionally, the circumferential walls 7 and 8 themselves have their flanges 10 and 11. Each one of the paired metal plates 6 and 6 is arranged so as to face in different directions and to match each pair of the cooling water flowing holes 3 and 4 to another pair of the holes formed in the adjacent metal plate 6.

The fin member 2 is of a type of multi-entry. The general shape of the multi-entry fin is made of waves and the outline of the waves resembles that of fastners of fabrics. The sides of rising walls and descending walls of a wavy metal plate have a number of openings. So that, dents of the waves constitutes openings through which fluid flows. The shape and functions of such fin members are well known as of the conventional heat exchangers. The fin member 2 has a flat doughnut-shape of an inner and an outer circumferential lines, respectively substantially equal to that of the metal plate 6. As shown in FIG. 5, the fin member 2 has a pair of holes 31 and 32 through which holes the flanges 12 and 13 of the metal plates 6 are inserted. According to the preferred embodiment of the present invention, all parts constituting the element 1 are made of aluminum or its alloys. A brazing sheet covering is applied or cladded to the core material of respective metal plates 6. For example, the core material is 3003 Al and the brazing sheet covering is X4004. The brazing sheet covering is applied to the both sides of the core material and the brazing and the core material don't contradict each other in character. It is possible to fabricate the fin member 2 of an aluminum plate without brazing covering to be applied to the outer surface of the fin member 2.

Figure 6:
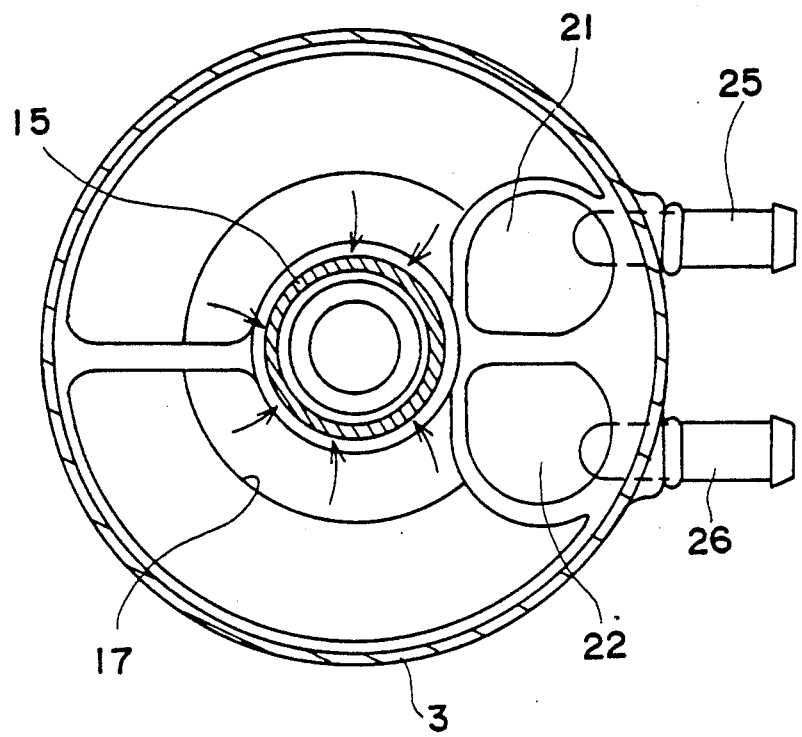
FIG. 6 is a section taken along the line VI—VI of FIG. 1.
Figure 7:
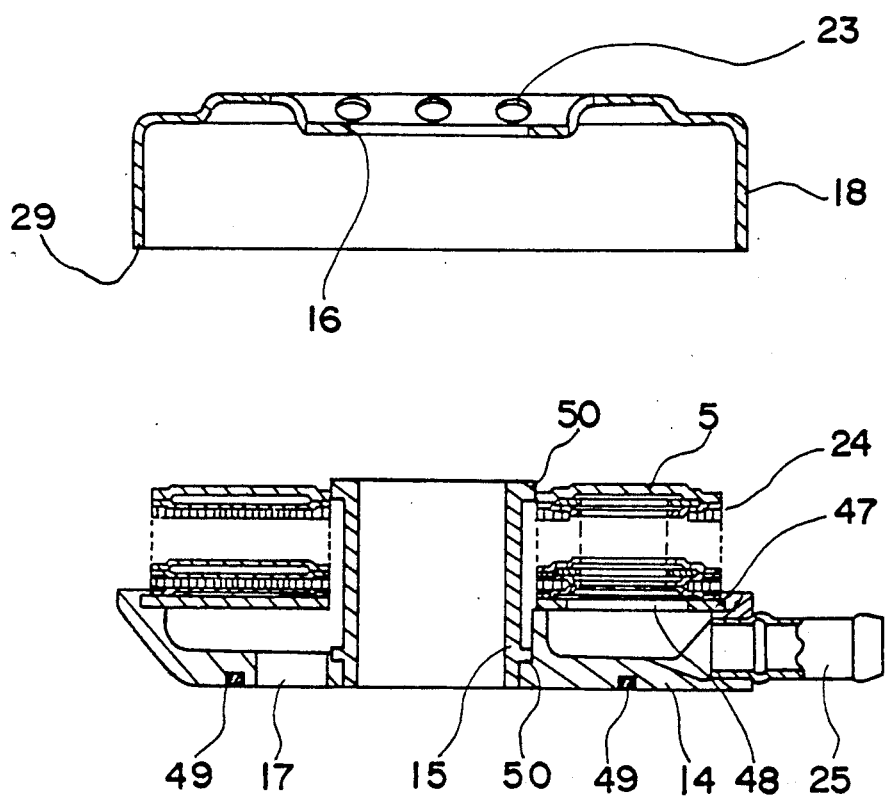
FIG. 7 is an explanatory view of the oil cooler fabricating method according to the present invention.

It is apparent that the oil cooler casing 20 consists of the base 14, the central pipe 15, and a dish-like member 18. It is shown in FIGS. 1 and 6 that the base 14 is constructed by a disc having a diameter a little larger than that of the core 24 and a central circular opening formed at the center of the base 14. The lower end of the center pipe 15 is fixed to the edge of the circular opening above. The base 14 has a partition extending along the diameter so as to divide the whole area of the base 14. A pair of concaves 21 and 22 are formed at the both sides of the partition of the base 14 and have conduits leading to the outer periphery of the base 14. A pair of cooling water supply and exit pipes 25 and 26 are inserted to the conduits and secured thereto. A pair of first arc-like oil holes 17 is formed near the central opening at both sides of the partition of the base 14. Further the base 14 has a ring-like or circular groove 49 formed on its bottom face at the diametrical outside position of the first oil holes 17 and an O-ring is installed or fitted into the circular groove 49. The central pipe 15 has as shown in FIG. 7 an upper small flange 50 and a lower small flange 50, respectively formed around the upper and lower ends of the pipe 15. The flanges 50 and 50 have a shape of ring and project sidewise. The lower flange 50 are seated to the inner edge of the central hole of the base 14. On the contrary, the upper flange 50 is connected to a central hole of the closing means 5. According to the prior art, the center bolt 35 has been made of stainless steel, however, it is preferable to fabricate the center bolt 35 by any metals identical with or differed by 10% or less than aluminum of the core in heat expansion coefficient. Therefore, even if the oil cooler functions at a severe heat cycle in which cycle the cooler frequently is heated and cooled, no looseness is generated in the engaged thread portion of the center bolt 35. The general shape of the dish-like member 18 is similar to a pan and it is applied to the base 14 after it is reversed. A central hole 16 is formed at the center of the dish bottom. A plurality of second oil holes 23 are formed around the central hole 16 leaving small distances from the edge of the hole 16. The circumferential edge 29 of the dish-like member 18 is fitted onto the stepped portion formed at the outer periphery of the base 14. The central hole 16 of the dish-like member 18 is shaped so as to be fitted to the circumferential outer wall of the top of the central pipe 15. All constitutional parts of the oil cooler casing are made of aluminum or its alloy materials.

Next, a manufacturing method for the oil cooler consisting of the various parts and members mentioned above will be described.

First two metal plates 6 and 6 are faced oppositely so as to contact the top stripe of the ridge 9 to another top stripe of the adjacent metal plate 6. A fin member 2 is placed on a top of the assembled metal plates 6 as shown in the exploded view of FIG. 5 so as to fit the holes 31 and 32 of the fin member 2 onto the flanges 12 and 13 formed on the upper metal plate 6. Such three parts of two metal plates 6, 6 and a fin member 2 construct or compose an element 1. In practice, a plurality of the elements 1 are piled to make a core of the oil cooler. Being piled, these elements are opposed to match or correspond these flanges 12 to each other and other flanges 13 to each other. The closing means 5 is placed on the top of the assembled elements and an end plate or lid 47 is applied to the bottom face of the core. The closing means 5 and the end plate 47, respectively are made of aluminum pieces with wax coverings coated thereon. The core 24 including the piled elements 1, the closing means 5, and the end plate 47 is placed on the base 14 of the casing as shown in FIG. 7. As described above, a pair of the cooling water supply and exit pipes 25 and 26 are inserted into the base 14. At least one brazing sheet covering is applied to one of the portions of the base 14 to which the cooling water supply and exit pipes are inserted. All parts or members but the dish-like member 18, such as the core 24, the closing element 5, the end plate 47, the base 14, and the cooling water supply pipes 25, 26 are inserted, after they are assembled as shown in FIG. 7, into a vacuum furnace of a high temperature. All contacting portions of the metal plates of the elements 1, fin members 2, the base 14, and the cooling water supply and exit pipes 25 and 26 are braze joined integrally and completely. Next, the dish-like member 18 is capped onto the base 14 after the base is treated and took out of the vacuum furnace, the outer circumferential edge 29 of the dish-like member 18 and the circumferential edge of the base 14 are intimately welded by a TIG (phonetic) welding process, as well as the central opening 16 of the dish-like member 18 is tig-welded to the upper edge of the center pipe 15.

The technical reason of separation of the base 14 of the oil cooler casing from the dish-like member 18 in the brazing adhering process, or the base 14 with the core 24 welded thereto and the dish-like member 18 are individually processed is to completely prevail or spread radiant heat ejected from the heater of the furnace, to quickly melt the brazing coverings coated on the outer surfaces of the metal plates, and to discharge or exhaust smoothly gas generated in the brazing adhering process. After the oil cooler is completed by such manufacturing method, a O-ring 36 is fitted into the circular groove 49 formed in the bottom face of the base 14. Then, the oil cooler casing 20 is placed on the engine block 46 contacting the base 14 with the top face of the block 46 so as to coincide the axis of the center pipe 15 with that of an oil entery hole 41 formed in the block. After that the center bolt 35 is inserted into the central pipe 15 and the oil entry hole 41, the center bolt 35 is rotated to engage threadly with these central pipe 15 and the oil entry hole 41, thus the casing 20 is firmly fixed to the engine block 46 through a flange 51 of the center bolt 35. The bottom face of the filter casing 42 containing the oil filter 39 is made contacted with the top face of the oil cooler casing 20 through a O-ring 37 placed between them and a central hole of the filter casing 42 engages with the top portion of the center bolt 35 so as to fasten the former to the latter. According to the preferred embodiment of the oil cooler of the present invention, the oil filter mechanism has a bypass valve 43, a bypass hole 44, and a coil spring 45. An end of a cooling water entry hose (not shown) is connected to the cooling water pipe 25 and an end of a cooling water exit hose (not shown) is joined to another cooling water pipe 26. Cooling water 28 shown by an arrow in FIG. 8 is flown through the cooling water pipe 25 into the concavity 21 formed in the case 14. Cooling water 28 then flows through respective elements 1 of the core 24 and backs to another concavity 21 and another cooling water pipe 25 as shown in FIG. 3 by a circular arrow. In detail, cooling water 28 enters into the elements 1 from the cooling water flowing hole 3, flows along the arc-like passage in the elements 1, and out of the core 24 from another cooling water flowing hole 4. While oil flows from the oil exit hole 40 formed in the engine block 46 to the first oil hole 17, then from the first oil hole to the gap 19 formed between the inner circumferential edge of the core 24 and the outer circumferential edge of the central pipe 15. After that, oil 34 proceeds along the radial lines shown in FIG. 4 on the fin member 2 through the gap 27 formed between the outer circumferential edge of the core 24 consisting of elements 1, the top plate, and the bottom lid and the inner circumferential edge of the dish-like member 18, and the second oil hole 23, flowing into the oil filter casing 42. Oil then passes through the oil filter 39 from its outside and the center bolt 35, being flown into the oil entry hole 41 of the engine block 46. During oil 34 flows through the fin member 2 of the core 24, it is cooled by means of the cooling water 28. Reference numeral 52 indicates a hole formed at the bottom face of the oil filter casing 42.

As mentioned above the oil cooler of the present invention has elements 1 of very simple in construction and of very effective in sealing, as well as cooling water 28 can flow smoothly through the elements 1. In addition, oil 34 also flows radially uniformly and smoothly without any stagnation of oil in the fin member 2.

According to the manufacturing method of the present invention, which is for example applied to aluminum made heat exchangers, gas can be effectively exhaled between respective parts and members of the heat exchanger placed in the vacuum furnace of a high temperature, and the core 24 and the base 14 of the oil cooler casing 20 are braze adhered integrally. It is simple to weld the lowest portion of the circumferential pendent edge of the dish-like member 18 to the base 14, and the dish-like member 18 to the top portion of the central pipe 15 in order to mass-produce reliable oil coolers. In addition these portions are accessible to the welder and operators, attaining good workability and reliable seals and water-tightness between parts of the motor oil passage and cooling water passage formed in the oil cooler according to the present invention.

What is claimed is:

1. An oil cooler comprising:
    a core of elements; and
    a casing housing said core, wherein said core is placed within said casing, said core being constructed by a plurality of flat and hollow doughnut-like elements with fin members sandwiched betwen said doughnut-like elements, said doughnut-like elements each having a pair of cooling water flowing holes which are aligned with the adjacent cooling water flowing holes of the adjacent element just under or above the former one, said fin members, respectively having corresponding holes formed therein being placed within each of said elements, cooling water flowing holes of the uppermost element of asid core being closed by a closing member,
    wherein each doughnut-like element consists of first and second metal plates having a flat doughnut shape, and an inner circumferential wall and an outer circumferential wall of the same height, said inner and outer circumferential walls being formed on the inner circumference and the outer circumference of each of said metal plates, a partition ridge extending diametrically between said inner and outer circumferential walls and having the same height as that of said circumferential walls, said cooling water flowing holes being placed at first and second sides of the partition ridge and respectively have peripheral ring-like portions around each hole projected outward so as to form flanges used for braze treatment, said metal plates being stacked so as to face a concave face of a plate to an opposite and concave surface of an adjacent metal plate under or above said plate,
    said casing consists of a planar doughtnut-shaped base, a central pipe having first and second ends, said central pipe attached to an inner peripheral edge of said base at said first end and passing therethrough, and a dish-like member having a central opening to which said second end of the central pipe is attached and having formed therein second oil openings around the circumferential edge of said central opening, said dish-like member is attached to the base through an outer pendent edge, a first gap being formed between the inner circumferential edge of the core and the outer wall of the central pipe and a second gap being formed between the outer circumferential edge of the core and the inner wall of said pendent portion of the dish-like member, the lower end of the first gap near the base being open to oil flow from said base and the upper end near the dish-like member being closed to oil flow and the lower end of the second gap near the base being closed to oil flow and the upper end adjacent to the dish-like member being open to said second oil openings, and the base having a pair of concavities, respectively formed therein so as to be opposite to the pair of cooling water flowing holes of an adjacent element, the base has a pair of cooling water flowing pipes, respectively leading to the concavities, said cooling water flowing pipes extending outward from the base, the peripheral edges of the stacked elements being connected to the peripheral edge of the base and a first oil hole is formed in the base so as to lead to the first gap, whereby oil flows from the first gap between the doughnut-like elements and out to the second gap.

2. A method of manufacturing an oil cooler, including a core of elements; and a casing housing said core, wherein said core is placed within said casing, said core being constructed by a plurality of flat and hollow doughtnut-like elements with fin members sandwiched between said doughnut-like elements, said doughnut-like elements each having a pair of cooling water flowing holes which are aligned with the adjacent cooling water flowing holes of the adjacent element just under or above the former one, said fin members respectively having corresponding holes formed therein being placed within each of said elements, cooling water flowing holes of the uppermost element of said core being closed by a closing member, wherein each doughnut-like element consists of first and second metal plates having a flat doughnut shape, and an inner circumferential wall and an outer circumferential wall of the same height, said inner and outer circumferential walls being formed on the inner circumferential and the outer circumference of each of said metal plates, a partition ridge extending diametrically between said inner and outer circumferential walls and having the same height as that of said circumferential walls, said cooling water flowing holes being placed at first and second sides of the partition ridge and respectively have peripheral ring-like portions around each hole projected outward so as to form flanges used for braze treatment, said metal plates being stacked so as to face a concave face of a plate to an opposite and concave surface of an adjacent metal plate under or above said plate, said casing consisting of a planar doughnut-shaped base, a central pipe having first and second ends, said central pipe attached to an inner peripheral edge of said base at said first end and passing therethrough, and a dish-like member having a central opening to which said second end of the central pipe is attached and having formed therein second oil openings around the circumferential edge of said central opening, said dish-like member is attached to the base through an outer pendent edge, a first gap being formed between the inner circumferential edge of the core and the outer wall of the central pipe and a second gap being formed between the outer circumferential edge of the core and the inner wall of said pendent portion of the dish-like member, the lower end of the first gap near the base being open to oil flow from said base and the upper end near the dish-like member being closed to oil flow, and the lower end of the second gap near the base being closed to oil flow and the upper end adjacent to the dish-like member being open to said second oil openings, and the base having a pair of concavities, respectively formed therein so as to be opposite to the pair of cooling water flowing holes of an adjacent element, the base has a pair of cooling water flowing pipes, respectively leading to the concavities, said cooling water flowing pipes extending outward from the base, the peripheral edges of the stacked elements being connected to the peripheral edge of the base and a first oil hole is formed in the base so as to lead to the first gap, whereby oil flows from the first gap between the doughnut-like elements and out to the second gap, wherein the structural parts making up said oil cooler are made of one of aluminum and its alloy materials, and coverings of braze material being previously applied to at least one of two structural parts to be adhered to each other, said method comprising the steps of:

removing said dish-like member constituting a part of the oil cooler casing, placing an assembly of core elements on the base constituting another part of said casing, melting the braze coverings applied to the elements in a high-temperature vacuum furnace, solidifying said soft braze coverings to attach all parts or members including the base integrally, and welding said outer pendent edge of the dish-like member to the outer circumferential edge of the base of the oil cooler casing, and welding said top portion of the center pipe to the central opening of the dish-like member, fabricating said core by stacking a plurality of flat and hollow doughnut-like elements, inserting the fin members between two adjacent elements, making the cooling water flowing holes of an element correspond to the holes of the adjacent element, and closing the cooling water flowing holes of the top element by said closing means, forming respective elements of a pair of flat and doughnut-like metal plates having an inner circumferential wall and an outer circumferential wall of the same height, respectively formed at the inner circumference and the outer circumference thereof, said pair of cooling water flowing holes are placed adjacently at both sides of the ridge extending in the radial direction of the metal plate and having the same height as that of the walls, projecting said flat and ring-like edges outward from said holes to form flanges and brazing to adhere these metal plates to each other in one of a back-to-back or front-to-front arrangement so as to make respective flowing holes correspond to adjacent flowing holes.

* * * * *